US011217217B2

(12) United States Patent
Ratner

(10) Patent No.: US 11,217,217 B2
(45) Date of Patent: *Jan. 4, 2022

(54) SYSTEMS AND METHODS FOR TUNING PROPELLER NOISE

(71) Applicant: Wing Aviation LLC, Mountain View, CA (US)

(72) Inventor: Daniel Ratner, San Francisco, CA (US)

(73) Assignee: WING AVIATION LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/892,540

(22) Filed: Jun. 4, 2020

(65) Prior Publication Data

US 2020/0335077 A1 Oct. 22, 2020

Related U.S. Application Data

(62) Division of application No. 15/297,740, filed on Oct. 19, 2016, now Pat. No. 10,714,069.

(60) Provisional application No. 62/331,383, filed on May 3, 2016.

(51) Int. Cl.
*G10K 11/04* (2006.01)
*B64C 39/02* (2006.01)
*B64C 11/00* (2006.01)

(52) U.S. Cl.
CPC ............ *G10K 11/04* (2013.01); *B64C 11/001* (2013.01); *B64C 39/024* (2013.01); *B64C 2201/108* (2013.01); *B64C 2201/162* (2013.01); *B64C 2220/00* (2013.01)

(58) Field of Classification Search
CPC ................. B64C 11/001; B64C 39/024; B64C 2201/108; B64C 2220/00; B64C 2201/162; G10K 11/04
See application file for complete search history.

(56) References Cited

U.S. PATENT DOCUMENTS

| 6,270,038 | B1 | 8/2001 | Cycon et al. | |
|---|---|---|---|---|
| 6,885,127 | B1* | 4/2005 | Higashino | H02K 1/16 310/179 |
| 7,033,137 | B2* | 4/2006 | Shufeldt | F04D 23/008 415/119 |
| 7,992,674 | B2* | 8/2011 | Gorny | G10K 11/172 181/225 |
| 8,270,628 | B2* | 9/2012 | Evert | G10K 11/17883 381/71.4 |

(Continued)

*Primary Examiner* — Kenneth Bomberg
*Assistant Examiner* — Adam W Brown
(74) *Attorney, Agent, or Firm* — McDonnell Boehnen Hulbert & Berghoff LLP

(57) ABSTRACT

The present disclosure relates to devices, systems, and methods for controlling and/or augmenting acoustic sounds emitted from flight vehicles, such as unmanned aerial vehicles (UAVs). For example, while in flight, a UAV may emit a characteristic sound or tone (or a plurality of such tones), which may be a result of propeller and/or motor noise. To mitigate such noise from UAVs, disclosed embodiments may include acoustic resonators that may provide additional tones to complement the sounds or tones emitted from the UAV. Namely, the acoustic resonators may be shaped, adjusted, or otherwise controlled to emit additional tones that form pleasing intervals in combination with the characteristic tone(s) from the UAV.

16 Claims, 11 Drawing Sheets

(56) References Cited

U.S. PATENT DOCUMENTS

| | | | |
|---|---|---|---|
| 8,622,334 B2 | 1/2014 | Drela et al. | |
| 9,394,045 B2* | 7/2016 | Koopmann | B64C 11/001 |
| 9,422,055 B1* | 8/2016 | Beckman | B64C 39/024 |
| 9,646,597 B1* | 5/2017 | Beckman | G10K 11/1783 |
| 9,745,050 B2* | 8/2017 | Beckman | B64C 27/08 |
| 10,232,931 B2* | 3/2019 | Huddleston, Jr. | B64C 11/008 |
| 10,714,069 B1* | 7/2020 | Ratner | B64C 11/001 |
| 2015/0179161 A1* | 6/2015 | Fujiwara | G10K 11/175 |
| | | | 381/98 |
| 2018/0032308 A1* | 2/2018 | Lan | G05B 19/042 |

* cited by examiner

Oblique view

Oblique view

Oblique view

Oblique view

SYSTEMS AND METHODS FOR TUNING PROPELLER NOISE

CROSS REFERENCE TO RELATED APPLICATIONS

This application is a divisional of U.S. patent application Ser. No. 15/297,740 filed Oct. 19, 2016 and claims priority to U.S. Provisional Application No. 62/331,383 filed on May 3, 2016, both of which are herein incorporated by reference in their entirety.

BACKGROUND

Unmanned autonomous vehicles (UAVs), helicopters, and other propeller-driven vehicles take advantage of rotating propeller blades to provide thrust and/or lift for movement. The high rotational speed of the propeller blades typically causes them to emit a characteristic "drone" or whine, which may be displeasing to listeners.

Musical chords include a plurality of tones consisting of one or more intervals. Chords may have pleasing (consonant) or displeasing (dissonant) properties with listeners based on the intervals included within the respective chord. For example, major chords that include a major third and a perfect fifth interval may sound "happy" or "complete." Conversely, a minor chord that may include a minor third and a perfect fifth may be considered "sad" or "blue."

SUMMARY

Systems and methods disclosed herein relate to modifying an acoustic environment around a propeller-driven vehicle. Namely, the propellers of such vehicles may emit an undesirable whine or drone noise when in operation. The natural drone noise may have a least one fundamental tone. In such a scenario, an acoustic resonator may emit an additional tone that may form an interval, such as a major third or a perfect fifth with the fundamental tone. In some embodiments, one or more acoustic resonators may provide a major chord or a melody to help augment the natural noise of the propeller-driven vehicle. As such, the systems and methods describe herein may help reduce undesirable noise pollution from propellers-driven vehicles, such as unmanned aerial vehicles (UAVs).

In an aspect, a device is provided. The device includes at least one propeller. While rotating, the at least one propeller emits at least one tone. The device also includes at least one acoustic resonator proximate to the at least one propeller. The at least one acoustic resonator is configured to emit at least one additional tone. The at least one additional tone forms an interval with respect to the at least one tone. The interval includes a major third or a fifth.

In an aspect, a system is provided. The system includes at least one propeller and at least one acoustic resonator proximate to the at least one propeller. The system also includes at least one tuning element coupled to the at least one acoustic resonator and at least one sensor. The system additionally includes a controller including at least one processor and a memory. The at least one processor is configured to carry out instructions stored in the memory so as to perform operations. The operations include receiving, via the at least one sensor, information indicative of at least one tone emitted from the at least one propeller. The operations also include, based on the received information, adjusting the at least one tuning element such that the adjusted tuning element and the corresponding acoustic resonator emit at least one additional tone.

In an aspect, a method is provided. The method includes causing at least one propeller to rotate. At least one acoustic resonator is proximate to the at least one propeller. At least one tuning element is coupled to the at least one acoustic resonator. The method also includes, while the at least one propeller is rotating, receiving, via at least one sensor, information indicative of at least one tone emitted from the at least one propeller. The method additionally includes, based on the received information, adjusting the at least one tuning element such that the adjusted tuning element and the corresponding acoustic resonator emit at least one additional tone.

In an aspect, a system is provided. The system includes various means for carrying out the operations of the other respective aspects described herein.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
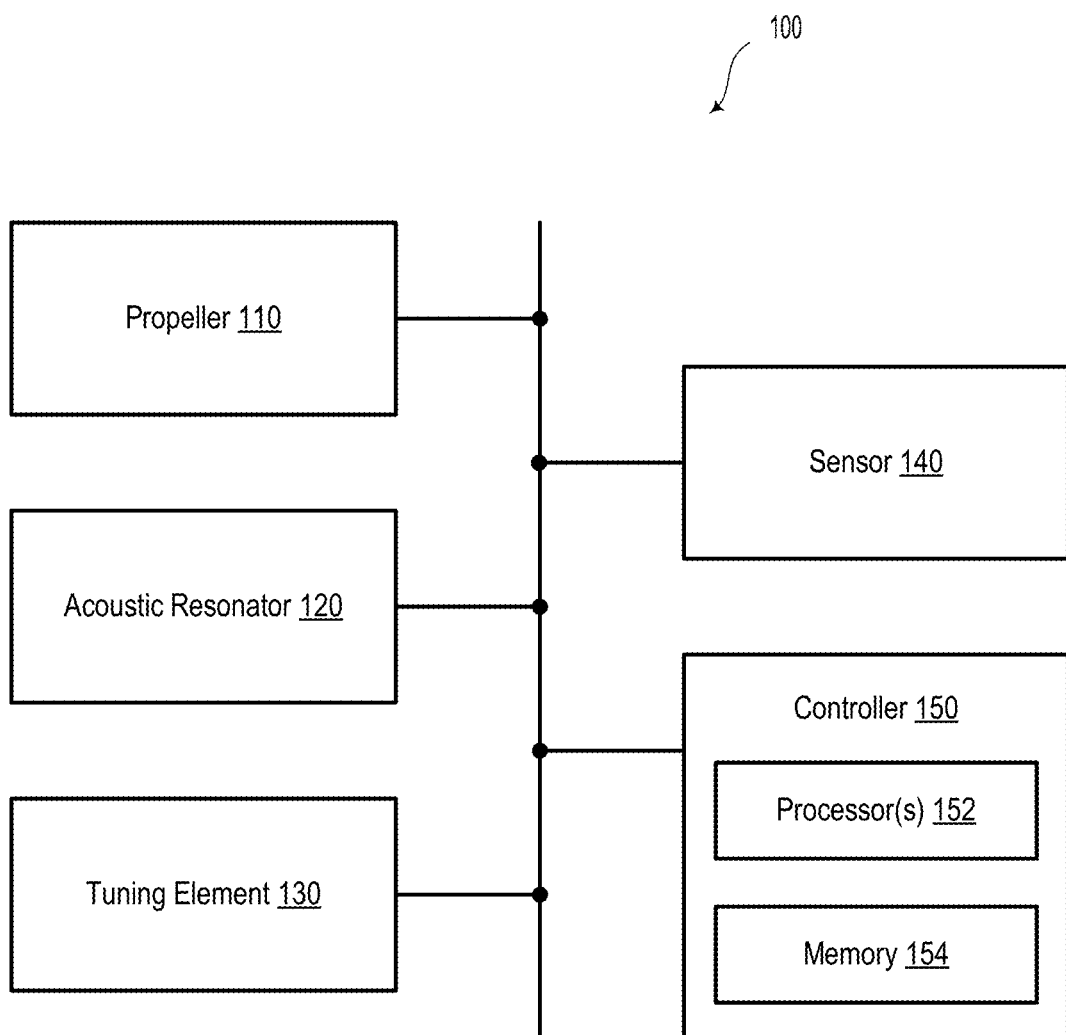
FIG. 1 illustrates a schematic diagram of a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

The present disclosure relates to devices, systems, and methods for controlling and/or augmenting acoustic sounds emitted from flight vehicles, such as unmanned aerial vehicles (UAVs). For example, while in flight, a UAV may emit a characteristic sound or tone (or a plurality of such tones), which may be a result of propeller and/or motor noise. To mitigate such noise from UAVs, disclosed embodiments may include acoustic resonators that may provide additional tones to complement the sounds or tones emitted from the UAV. Namely, the acoustic resonators may be shaped, adjusted, or otherwise controlled to emit additional tones that form intervals with the characteristic UAV tone(s). In an example embodiment, the additional tones may form a major chord (e.g., root note, major third, perfect fifth). Major chords may be used as they generally form a "happy" combination of tones. However, other chords are possible. Alternatively or additionally, the additional tones may be combined together and/or successively to form a melody or song.

By adding one or more additional tones to form intervals, chords, and/or melodies, UAVs in flight may be able to produce sounds that are less acoustically offensive than a characteristic "drone" noise. In some embodiments, the one or more additional tones may provide an indication of a flight mode of the UAV and/or a purpose of the UAV.

In an example embodiment, a device may include a propeller and an acoustic resonator. The propeller may emit a tone while rotating. The acoustic resonator may be arranged proximate to the propeller. For example, the acoustic resonator may be a shroud that partially encloses the propeller. The acoustic resonator may alternatively be coupled to the propeller and/or form a portion of the shroud. The acoustic resonator may be shaped or otherwise configured to emit at least one additional tone such that the natural UAV tone and the additional tone(s) form a chord. The chord may include a plurality of intervals that includes a major third and a perfect fifth with respect to the natural UAV tone.

In another example embodiment, a system may further include at least one tuning element coupled to the acoustic resonator, a sensor, and a controller having a processor and a memory. The controller may carry out commands such as receiving, via the sensor, information about the tone or tones emitted from the propeller. Based on the information, the controller may adjust the at least one tuning element, which in turn may cause the acoustic resonator to emit an additional tone or tones.

In a further example embodiment, a method may include causing a propeller to rotate. An acoustic resonator may be proximate to the propeller and the acoustic resonator may be coupled to at least one tuning element. While the propeller is rotating, the method may include receiving information from a sensor. The information may be indicative of a tone or plurality of tones produced by the spinning propeller blade(s). Based on the information, the method may include adjusting the at least one tuning element so the adjusted tuning element and the corresponding acoustic resonator emit at least one additional tone. As described herein, the at least one additional tone may include a melody, an interval, and/or a chord.

II. Example Devices and Systems

FIG. 1 illustrates a schematic diagram of a system 100, according to an example embodiment. System 100 includes a propeller 110, an acoustic resonator 120, and a tuning element 130. System 100 also includes a sensor 140 and a controller 150. Generally, system 100 may be incorporated in an unmanned aerial vehicle (UAV) or another type of propeller-driven vehicle, such as a helicopter, propeller-driven airplane, hovercraft, or airboat. Alternatively, system 100 may be incorporated into other types of vehicles or applications that utilize propellers, such as wind turbines, open rotor (propfan), turboprop, or turbofan engines.

Propeller 110 may be operable to provide thrust, lift, and/or propulsion for a vehicle, such as a UAV or another propeller-driven vehicle. Propeller 110 may be one of a plurality of propellers. Propeller 110 may include any number of propeller blades. For example, in an embodiment, propeller 110 may include a single propeller blade. Alternatively, propeller 110 may include two or more propeller blades. In some example embodiments, propeller 110 may include a shroud that surrounds and/or is proximate to at least a portion of a path of the rotating propeller. That is, the shroud may include an enclosure that at least partially encloses the propeller 110.

Propeller 110 is configured to rotate to provide propulsion, for example in the case of an airplane propeller. Additionally or alternatively, propeller 110 may provide electrical power, such as in the case of a wind turbine or hybrid propeller drive. While rotating, propeller 110 may emit one or more "natural tones" that may vary based on, for example, a rotational rate (RPM), airspeed, aircraft configuration, etc. In an example embodiment, propeller 110 may be configured to rotate at 3000 RPM during normal cruise operation. In such a scenario, propeller 110 may emit a natural tone around 120 Hz and corresponding overtones (e.g., 240 Hz, 360 Hz, 480 Hz, etc.).

Acoustic resonator 120 may include one or more elements configured to form one or more tones based, at least in part, on a natural resonance of acoustic resonator 120. Acoustic resonator 120 may include one or more pipes, which may have different length sections, similar to a pipe organ. Acoustic resonator 120 may be incorporated into a shroud of propeller 110. For example, acoustic resonator 120 may be a cavity resonator that may emit sound in response to air vibrating in a cavity of the shroud. In an example embodiment, acoustic resonator 120 may be coupled to propeller 110. Additionally or alternatively, acoustic resonator 120 may be located elsewhere on the aircraft/vehicle. In an embodiment, system 100 may include a plurality of acoustic resonators, which may be arranged along different radii of the propeller. In such a scenario, the position of the respective resonators may be arranged along propeller 110 so their relative speeds during normal propeller operation provide different respective wind speeds across them. As such, each of the plurality of acoustic resonators may provide a different tone of a collective chord.

Acoustic resonator 120 may include a resonating device such as those in musical instruments. For example, acoustic resonator 120 may be similar or identical to strings of a stringed instrument, a head of a drum, or wooden or steel bars on another type of percussion instrument, such as a xylophone. Generally, acoustic resonator 120 may be formed of metal, plastic, wood, or another type of material configured to sustain and project vibrations and/or standing waves associated with acoustic tones described herein. Other types of acoustic resonators are contemplated within the scope of this disclosure.

Acoustic resonator 120 may produce tones with various timbres, or tone qualities. For example, acoustic resonator 120 may produce tones with specific attack and sustain characteristics. Additionally or alternatively, acoustic resonator 120 may produce tones with a characteristic spectral envelope or characteristic prefix (onset of sound). In some embodiments, a timbre of acoustic resonator 120 may be controlled via tuning element 130.

Tuning element 130 may be operable to adjust acoustic resonator 120. For example, tuning element 130 may be operable to adjust acoustic resonator 120 such that acoustic resonator 120 may controllably emit a first tone or a second tone. That is, tuning element 130 may be controlled to change one or more tones, or the pitch of such tones, emitted by acoustic resonator 120. By way of example, tuning element 130 may be configured to adjust one or more resonance frequencies of acoustic resonator 120. In an example embodiment, tuning element 130 may include a movable portion of the acoustic resonator 120, e.g., a valve or movable cavity extension. That is, tuning element 130 may resemble controllable valves on a flute or saxophone. Alternatively or additionally, tuning element 130 may be operable to expand or compress a resonant cavity of acoustic resonator 120. That is, tuning element 130 may resemble and/or operate similarly to a trombone or slide whistle, although other configurations are, of course, possible.

Sensor 140 may include an acoustic sensor configured to provide information indicative of acoustic tones within an environment of system 100. In an example embodiment, sensor 140 may be configured to provide real-time information indicative of the tonal content of the environment of system 100. For example, sensor 140 may provide information to the controller 150 about the audio spectrum. Specifically, sensor 140 may be configured to detect various aspect of sound (e.g., volume, tone, and timbre) produced by propeller 110 and/or acoustic resonator 120. In an example embodiment, sensor 140 may include one or more microphones. Additionally or alternatively, sensor 140 may include an accelerometer or another type of transducer configured to detect mechanical or acoustic vibrations. Other types of sensors are contemplated herein.

Sensor 140 may alternatively be configured to provide information regarding a rotational speed of propeller 110 (e.g., revolutions per minute, RPM). In such a scenario, sensor 140 may include a timing light, a timing camera, a photodetector, and/or another system or device configured to provide information indicative of a movement of propeller 110. Based on the information from sensor 140, controller 150 may be operable to determine properties of sound being emitted from the propeller 110 and/or acoustic resonator 120. For example, controller 150 may use a look-up table with a plurality of acoustic spectra measured under similar propeller speed conditions.

Controller 150 includes at least one processor 152 and a memory 154. Controller 150 may include one or more computers configured to carry out operations. For example, the at least one processor 152 may execute instructions stored in memory 154 so as to conduct the operations. At least one processor 152 may include a multi-core processor or a distributed server system. Memory 154 may include a non-transitory computer readable medium, such as a dynamic random access memory (DRAM). Other types of computer readable media are contemplated.

Controller 150 may be located proximate to one or more elements of system 100. Alternatively or additionally, at least a portion of controller 150 need not be located proximate to other elements of system 100. For example, controller 150 may include a plurality of computers such as a cloud server network.

Controller 150 may carry out various operations, such as receiving, via sensor 140, information indicative of at least one tone emitted from propeller 110. That is, sensor 140 may provide acoustic information to controller 150, which may include volume, tone, pitch, etc.

Based on receiving the information, controller 150 may adjust tuning element 130. For example, controller 150 may cause a valve of tuning element 130 to close, open, or otherwise change position. Alternatively or additionally, controller 150 may cause a resonant cavity of acoustic resonator 120 to become smaller, larger, or otherwise change shape.

In such a scenario, acoustic resonator 120 may emit at least one tone in addition to the natural tone(s) emitted from propeller 110 during operation. In particular, the natural tone(s) emitted from propeller 110 during operation in combination with the at least one further tone emitted from the acoustic resonator 120 may include at least one interval. The at least one interval may include a major third, perfect fifth, or another interval. The respective intervals may be considered with respect to one or more natural tones emitted from propeller 110. As such, the one or more natural tones may be a considered "root" or fundamental tone. Additionally or alternatively, one or more further tones emitted from acoustic resonator 120 may be considered the "root" or fundamental tone. Furthermore, chord inversions are contemplated. As such, a fundamental tone may be provided by acoustic resonator 120. In an example embodiment, the combination of natural tones and further tones may form a pleasant chord, such as a major chord.

It will be understood that many different pleasant-sounding chords, tones, and/or timbres are possible. Additionally or alternatively, system 100 may be configured to emit a melody, harmony, or another type of succession of tones. Furthermore, system 100 may be configured to emit sounds based on an operating state of the vehicle.

FIGS. 2A-2D illustrate various example aircraft, according to example embodiments. System 100 may be integrated into such example aircraft as illustrated and described in FIG. 1. However, system 100 may be integrated into other vehicles or applications as well.

Figure 2A:
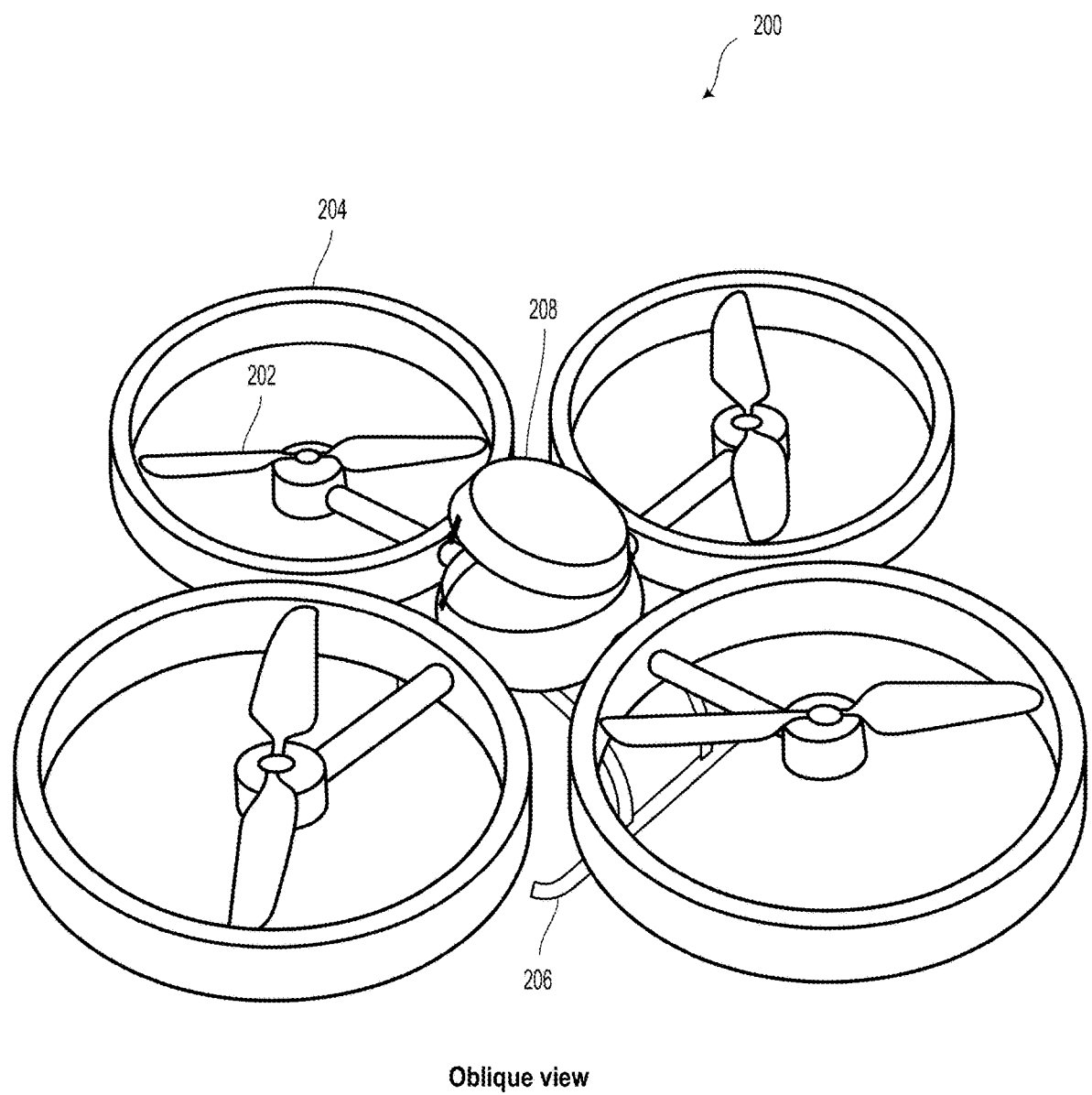
FIG. 2A illustrates an aircraft, according to an example embodiment.

FIG. 2A illustrates an aircraft 200, according to an example embodiment. Aircraft 200 may be a UAV with one or more propellers 202. As illustrated, propeller 202 may include two propeller blades, however other numbers of propeller blades are contemplated. While rotating, propeller(s) 202 may be configured to provide lift and/or thrust for aircraft 200. The propellers 202 may be surrounded, at least in part, by a cowling or a shroud 204. In some embodiments, shroud 204 may form part of a ducted propeller assembly, such as a Kort nozzle. For example, a position and/or angle of shroud 204 and propeller 202 may be adjusted so as to control a position, speed, and/or heading of aircraft 200 while in flight. In an embodiment, acoustic resonator(s) 120 and/or tunable element(s) 130 may be incorporated into shroud 204, propellers 202, or elsewhere as elements of aircraft 200.

In an example embodiment, aircraft 200 may include landing gear 206, which may include one or more legs, floats, and/or wheels. Aircraft 200 may also include a payload container 208 configured to house a payload. For example, aircraft 200 may be configured to autonomously deliver payloads to various locations. Alternatively or additionally, aircraft 200 may be configured to monitor traffic or weather conditions.

Figure 2B:
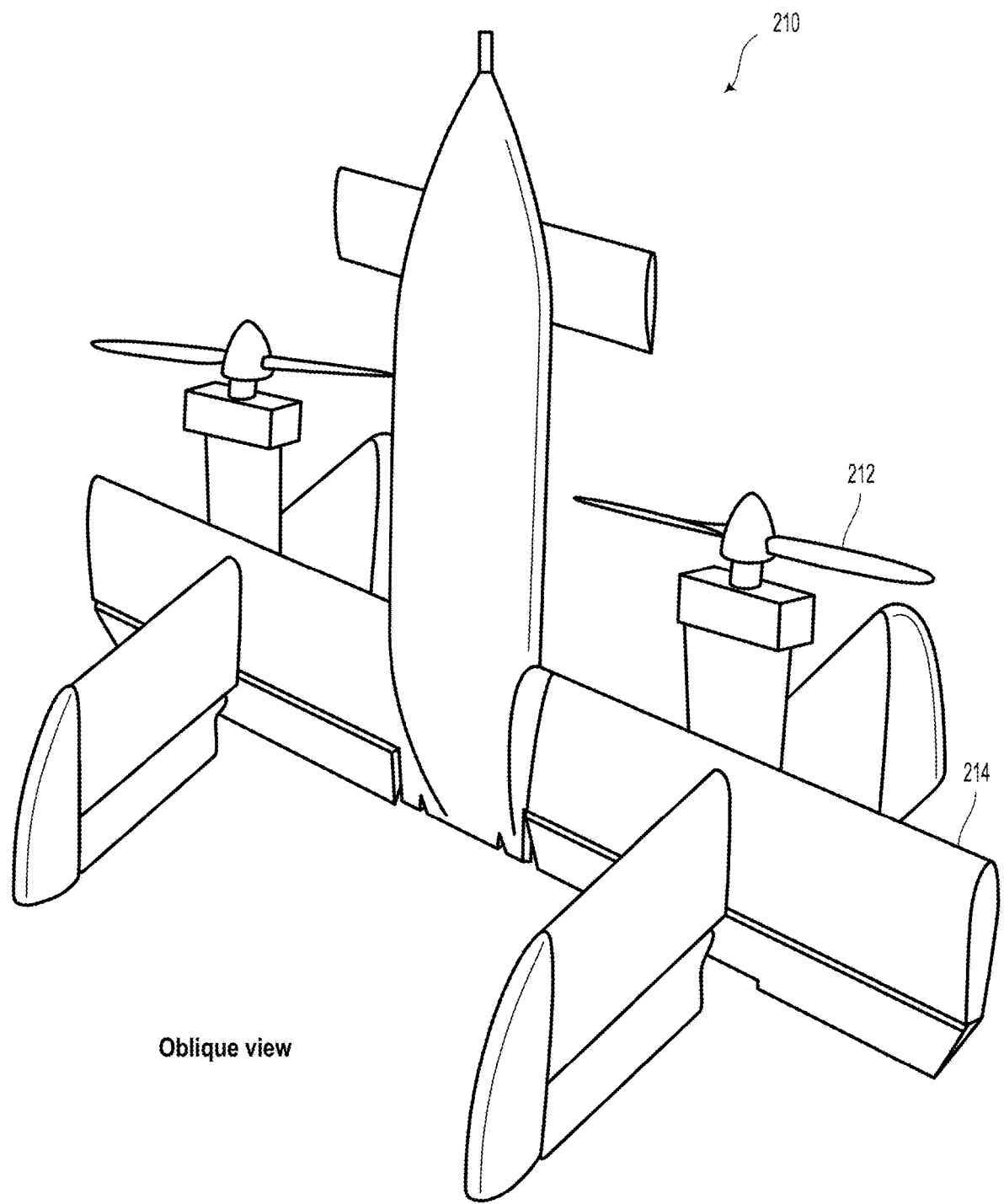
FIG. 2B illustrates an aircraft, according to an example embodiment.

FIG. 2B illustrates an aircraft 210, according to an example embodiment. Aircraft 210 may include one or more propellers 212 and flight surfaces 214. In an embodiment, acoustic resonator(s) 120 and/or tunable element(s) 130 may be incorporated into propellers 212 and/or flight surfaces 214.

Figure 2C:
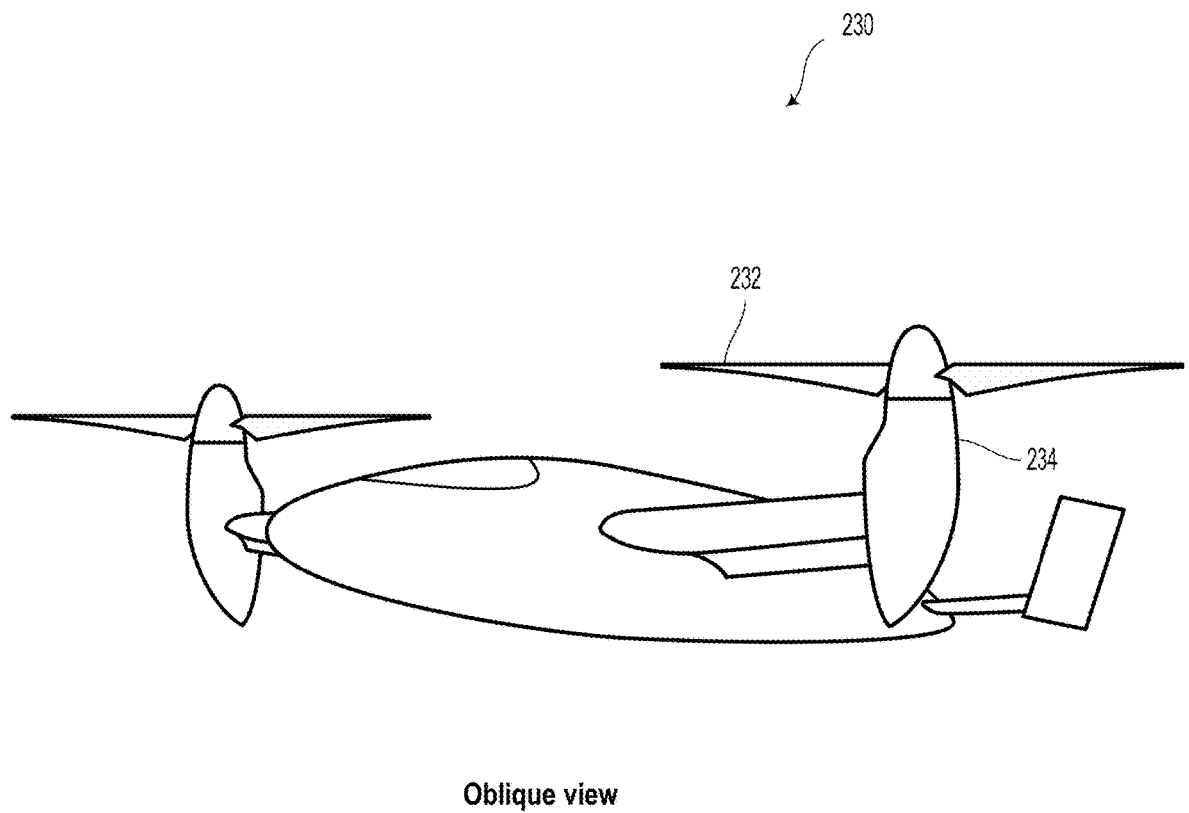
FIG. 2C illustrates an aircraft, according to an example embodiment.

FIG. 2C illustrates an aircraft 230, according to an example embodiment. Aircraft 230 may include at least one propeller 232. In some embodiments, aircraft 230 may include one or more adjustable nacelles 234. In such a scenario, acoustic resonator(s) 120 and/or tunable element(s) 130 may be incorporated into the at least one propeller 232 or the one or more adjustable nacelles 234. In example embodiments, aircraft 200, aircraft 210, and aircraft 220 may be configured for vertical takeoff and landing (VTOL).

Figure 2D:
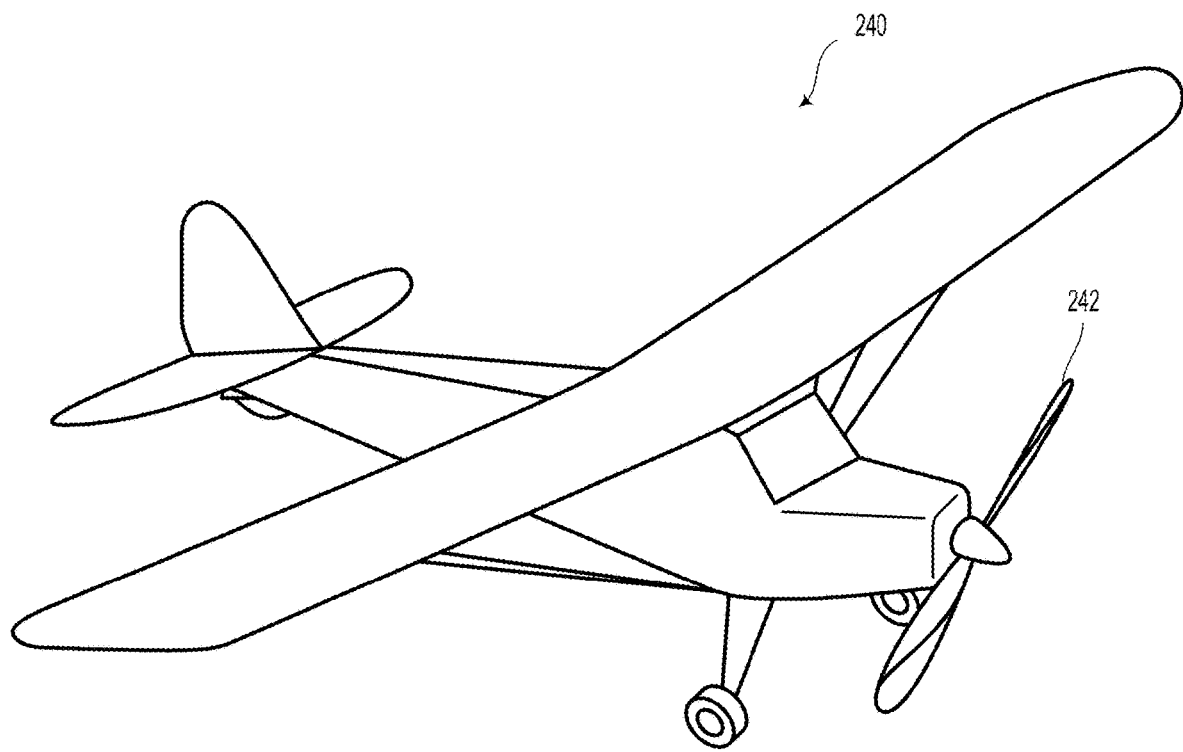
FIG. 2D illustrates an aircraft, according to an example embodiment.

FIG. 2D illustrates an aircraft 240, according to an example embodiment. Aircraft 240 may include one or more propellers 242. In an embodiment, acoustic resonator(s) 120 and/or tunable element(s) 130 may be incorporated into propeller 242.

Figure 3A:
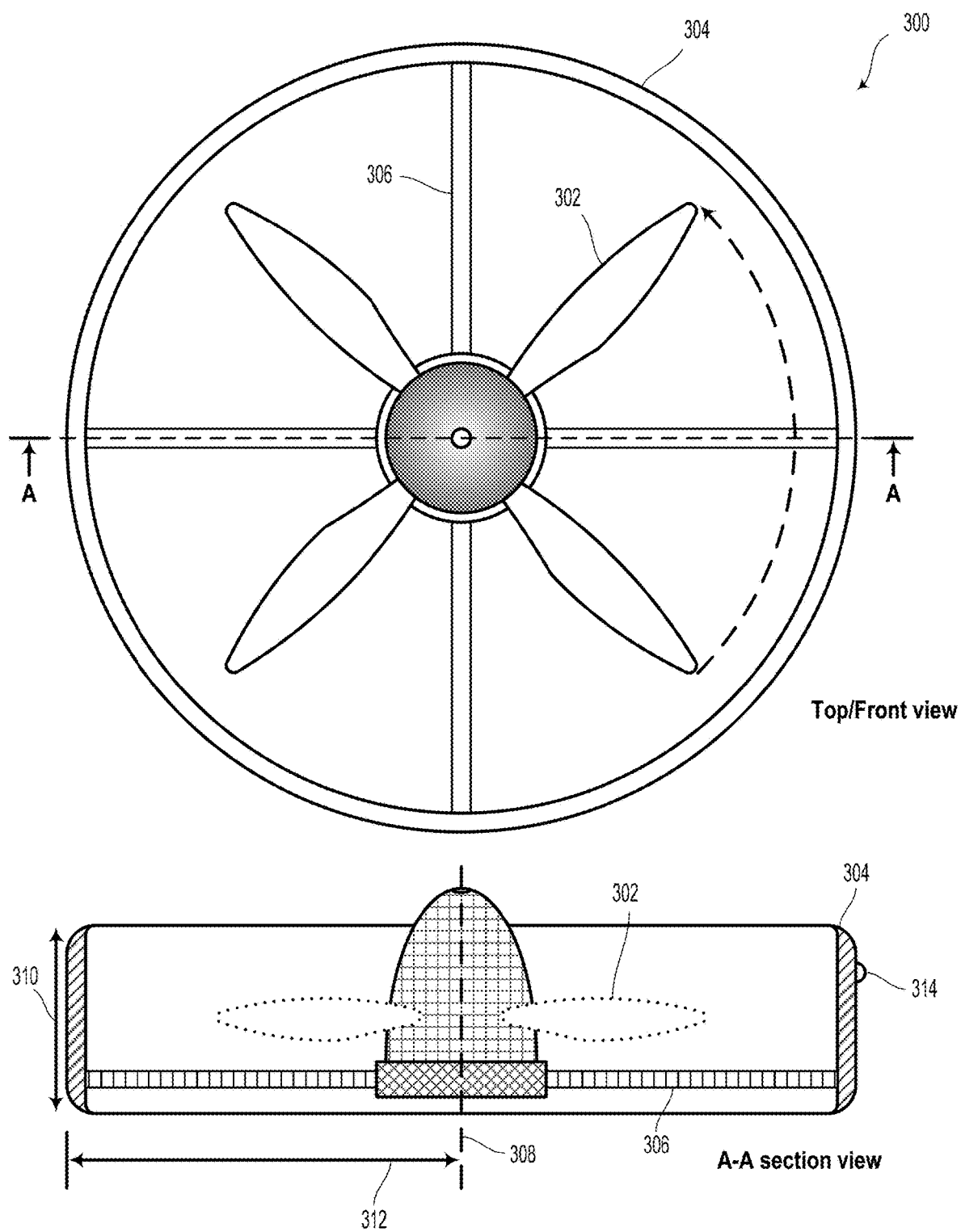
FIG. 3A illustrates a propeller assembly, according to an example embodiment.
Figure 3B:
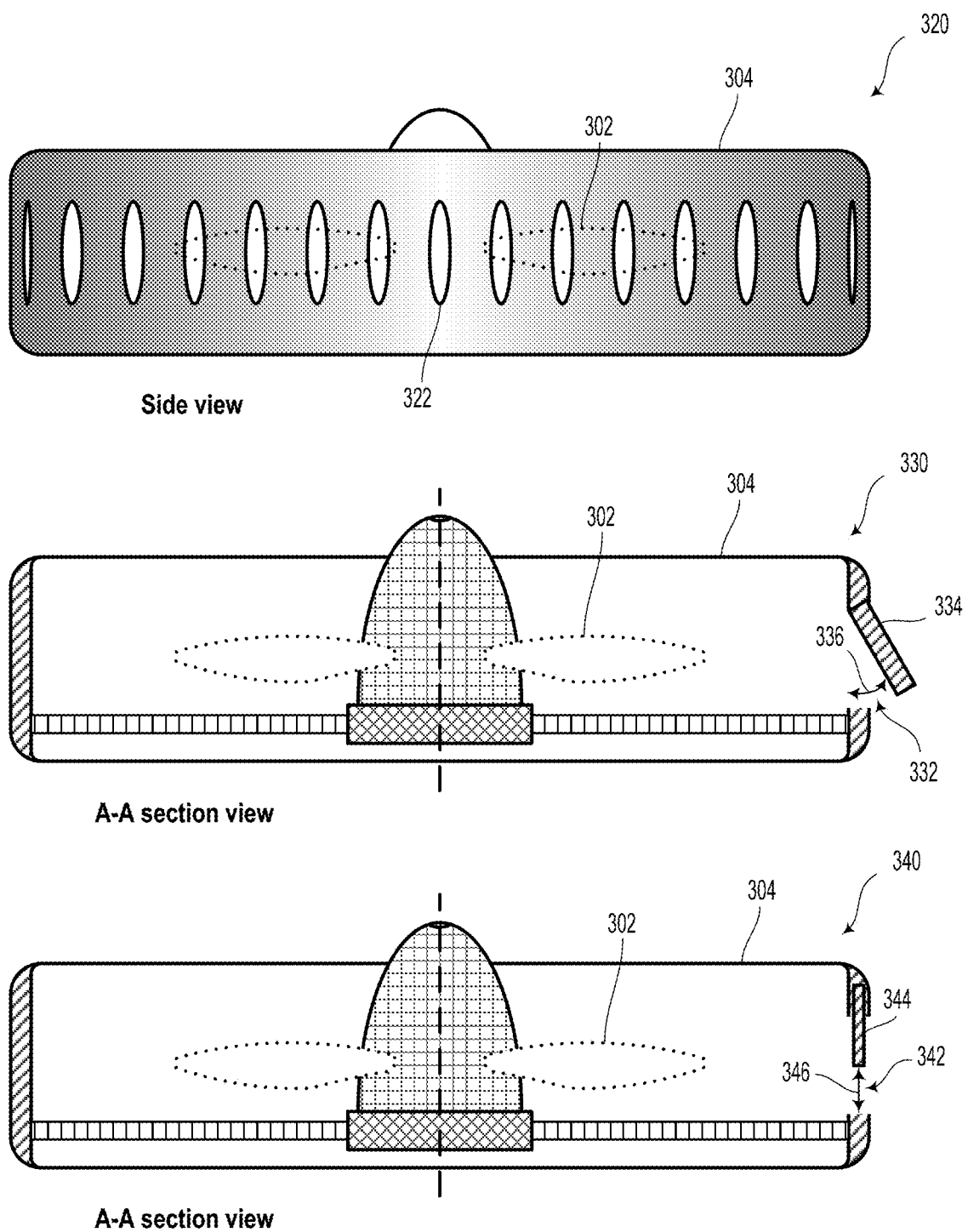
FIG. 3B illustrates propeller assemblies, according to example embodiments.
Figure 3C:
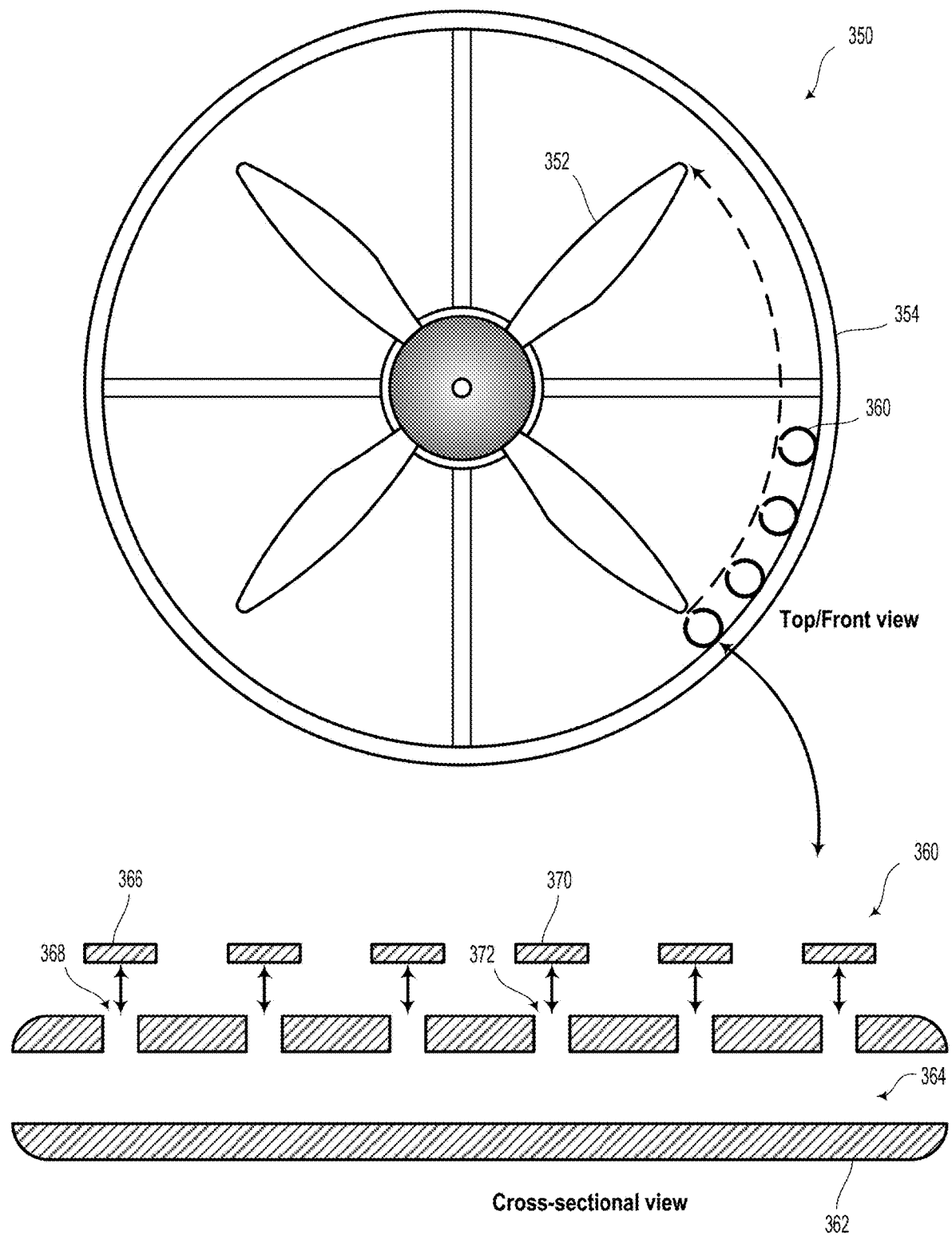
FIG. 3C illustrates a propeller assembly and resonator, according to an example embodiment.

FIGS. 3A-3C illustrate various propeller assemblies, according to several example embodiments.

FIG. 3A illustrates a propeller assembly 300, according to an example embodiment. Propeller assembly 300 includes a propeller 302 and a shroud 304. The shroud 304 may be coupled to the propeller 302 and its rotational axis 308 via one or more struts 306.

Shroud 304 may include a fairing, a nacelle, or another type of housing that at least partially encloses propeller 302. Shroud 304 may be aerodynamically shaped and/or may be configured to change shape to control, for example, a vector/direction of thrust.

In an example embodiment, shroud 304 may be configured to change its depth 310 with respect to the axis of rotation 308. Additionally or alternatively, shroud 304 may be configured to adjust its radius 312, diameter, and/or circumference with respect to the axis of rotation 308. In such a scenario, adjusting depth 310 and/or radius 312 may be similar or identical to adjusting tuning element 130 as illustrated and described in reference to FIG. 1.

In an example embodiment, propeller assembly 300 may include sensor 314. Sensor 314 may be mounted to shroud 304 or another location on propeller assembly 300 or the vehicle generally. Sensor 314 may be similar or identical to sensor 140 as illustrated and described in relation to FIG. 1. Specifically, sensor 314 may be configured to provide information indicative of a sound environment of the propeller assembly 300. As such, sensor 314 may provide information about tones emitted from the propeller 302 during operation as well as tones emitted from one or more acoustic resonators as described elsewhere herein.

FIG. 3B illustrates propeller assemblies 320, 330, and 340, according to example embodiments. Propeller assembly 320 may include one or more ports 322 in shroud 304. As illustrated, a plurality of ports 322 may be arranged around shroud 304 and may form holes that may permit air to pass from an exterior of shroud 304 to an interior of shroud 304. As such, the air passing through, over, and/or around the ports 322 may create one or more tones. Furthermore, the tones provided may change in pitch, volume, and/or timbre based on the airspeed through, over, and/or around the ports 322.

Propeller assembly 330 includes one or more ports 332 which may be adjusted via tuning element 334. As illustrated, tuning element 334 may include a flap that may be controllably opened and closed via, for example, a mechanical actuator. By adjusting a position of tuning element 334, an opening size 336 may be changed. As such, a volume, tone, pitch, or timbre of one or more generated tones may be controlled based on the opening size 336.

Propeller assembly 340 may include one or more ports 342. An opening size 346 may be adjusted by changing a position or orientation of tuning element 344. As illustrated, tuning element 344 may include a sliding element configured to open by retracting into a portion of the shroud 304 or close by extending over the port 342. The position of tuning element 344 may be adjusted via a mechanical actuator. Similar to other embodiments herein, a volume, tone, pitch, or timbre of one or more generated tones may be controlled based on the opening size 346 of port 342.

FIG. 3C illustrates a propeller assembly 350 and an acoustic resonator 360, according to an example embodiment. Propeller assembly 350 may include a propeller 352 and a shroud 354. One or more acoustic resonators 360 may be arranged along shroud 354.

Acoustic resonator 360 may include a body 362 that defines a cavity 364. In an example embodiment, a combination of the shape and size of the cavity 364 and/or the material of body 362 may define one or more resonant frequencies of acoustic resonator 360. Acoustic resonator 360 may include a first tuning element 366 which may be configured to open and close a first port 368. Acoustic resonator 360 may also include a second tuning element 370 configured to open and close a second port 372. By opening or closing the respective ports, one or more resonant frequencies and/or timbres produced by the acoustic resonator 360 may be adjusted. In an example embodiment, acoustic resonator 360 may include a plurality of ports which may be controllably opened or closed so as to form a chord, a note, and/or a succession of such chords or notes. Although acoustic resonator 360 is illustrated as having open ends, like a bassoon, other configurations of acoustic resonator 360 are possible. For example, acoustic resonator 360 may include one open end and one closed end, similar to a flute. In yet another example, acoustic resonator 360 may have two closed ends. Other configurations of acoustic resonator 360 for providing further tones in addition to natural tones emitted from an operating propeller are contemplated herein.

Figure 4A:
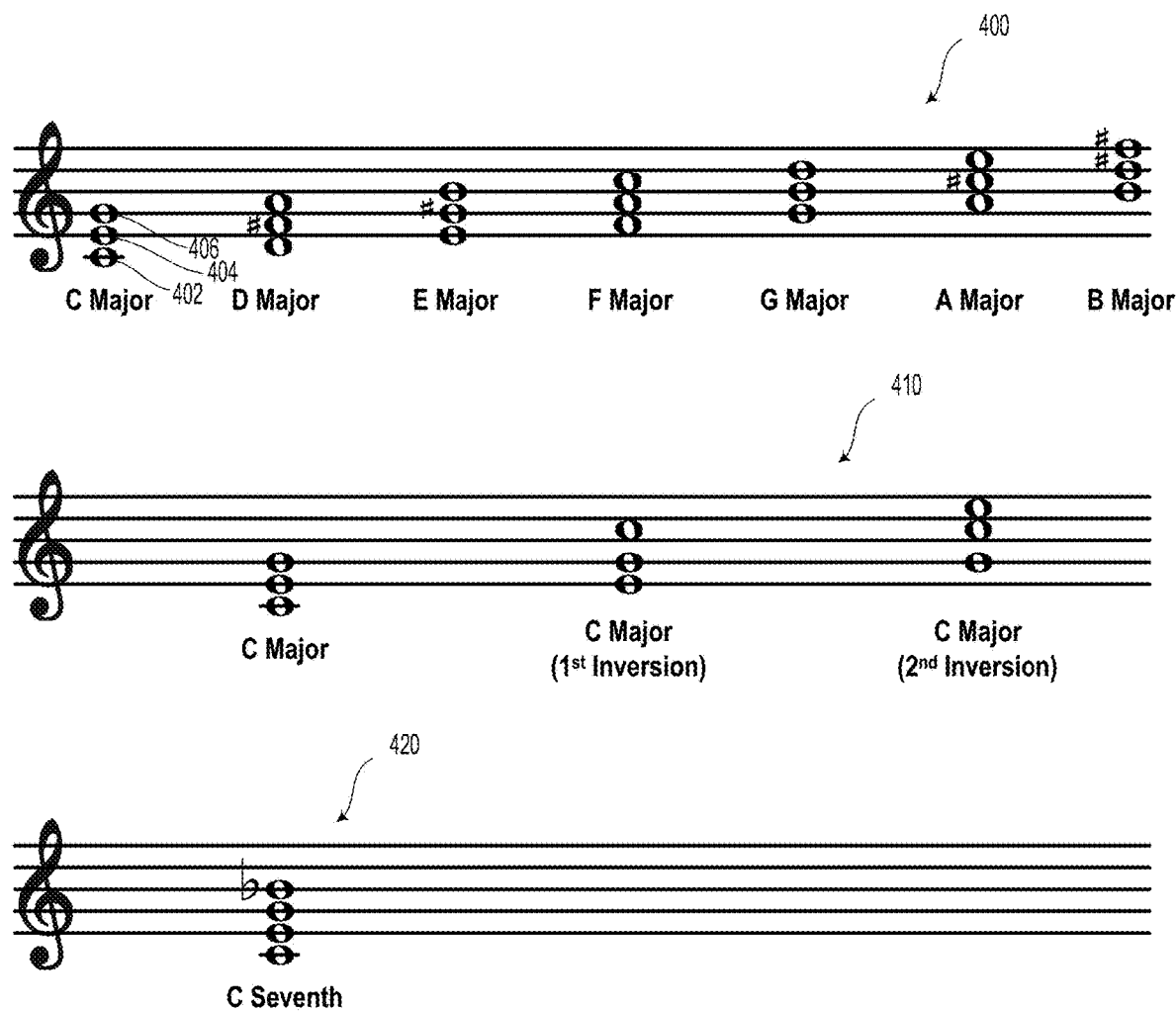
FIG. 4A illustrates various musical chords, according to an example embodiment.

FIG. 4A illustrates various musical chords 400, according to an example embodiment. The various musical chords 400 may include chords that may be formed by the systems and methods disclosed herein. For example, in the case of C Major, a natural tone emitted from one or more propellers may include middle C 402, or the fundamental tone of the C Major triad or chord. In such a scenario, one or more acoustic resonators may be adjusted to provide tones within the C Major chord. That is, a first acoustic resonator may provide an E 404 above middle C 402 and a second acoustic resonator may provide a G 406 above middle C 402. Taken in combination, the three tones may form the C Major chord.

Although C, D, E, F, G, A, and B Major chords are illustrated, it is understood that other chords are possible. Additionally, while triads are illustrated, single notes, diads, and/or chords with more than three notes are contemplated.

Furthermore, chord inversions 410 are possible. That is, the fundamental tone or "root" of the chord need not be the lowest tone. Rather, the chords may include inverted chords that incorporate the fundamental tone at other relative positions within the chord. For example, in a three-note chord, the combination of tones may include a $1^{st}$ inversion chord or a $2^{nd}$ inversion chord. Other types of chord combinations, such as those involving octaves and half tones are possible.

Additionally, while major chords are described herein, other types of chords are contemplated. For example, seventh chords 420 are possible within the scope of the present disclosure. That is, the seventh chord 420 may include a major triad as well as a fourth tone with an interval of a minor seventh with respect to the fundamental tone.

Figure 4B:
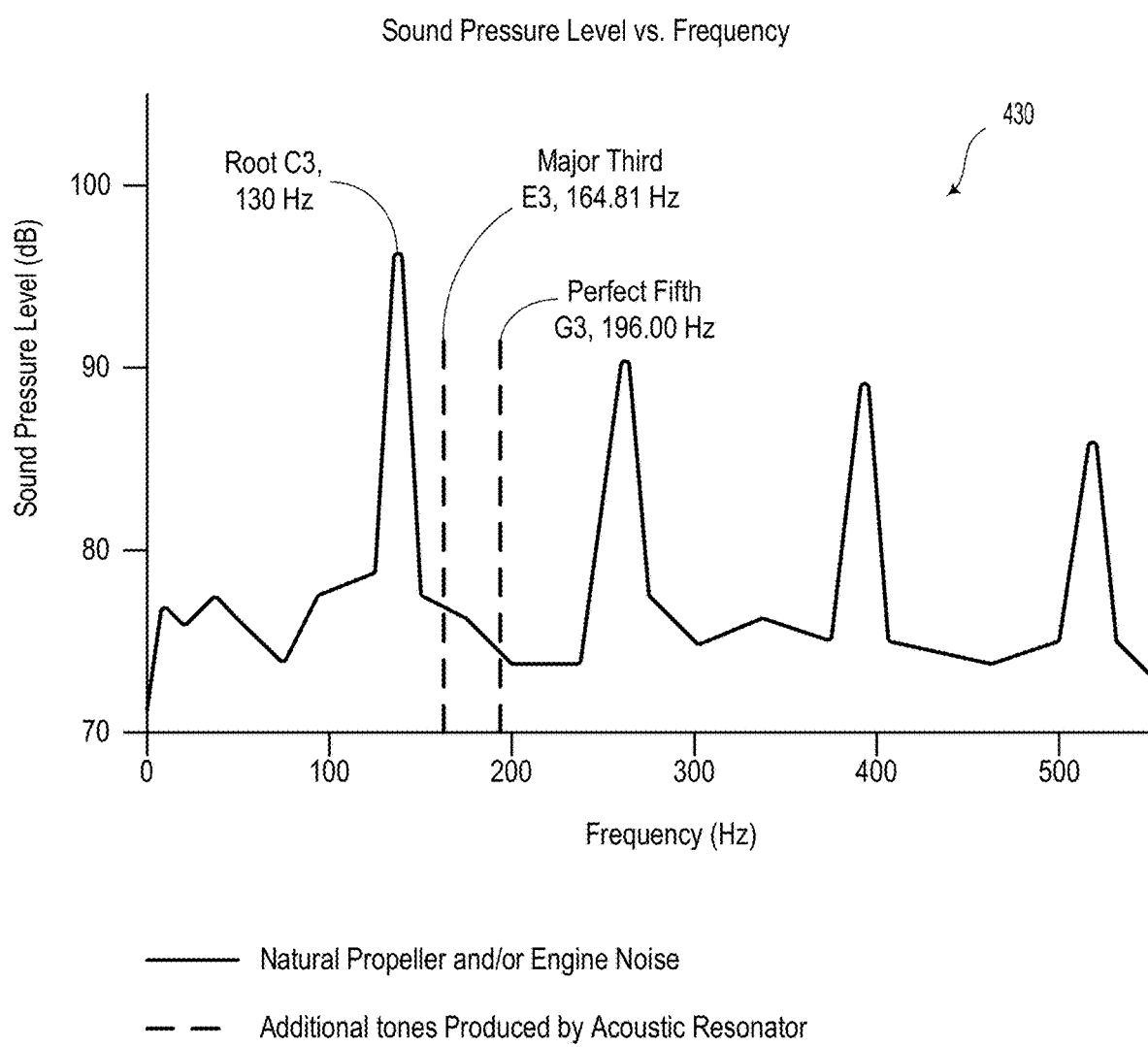
FIG. 4B illustrates an acoustic spectrum, according to an example embodiment.

FIG. 4B illustrates an acoustic spectrum 430, according to an example embodiment. As illustrated, acoustic spectrum 430 may include specific tones, such as C3 (130 Hz) as well as overtones (e.g., octaves) and broad-spectrum noise. Acoustic spectrum 430 may be representative of sounds emitted by the propeller and/or engine (solid line) as well as additional tones produced by one or more acoustic resonators (dashed line).

Acoustic spectrum 430 includes information in the form of sound pressure level (SPL) in decibels (dB) versus Frequency in Hertz (Hz). In some example embodiments, as illustrated, some propeller noise signals may approach 100 dB. However, such information is illustrative in nature only and noise signals with different sound pressure levels (both louder and softer) are possible.

Acoustic spectrum 430 may be determined based on information received from a sensor, such as sensor 140 or sensor 314, as illustrated and described in reference to FIGS. 1 and 3A, respectively. Based on the information received from the sensor, the one or more acoustic resonators (e.g., acoustic resonator 120 as illustrated and described in reference to FIG. 1) may be controlled by adjusting one or more tuning elements so as to provide tones with specific intervals with respect to a natural tone, in this example C3 (130 Hz). For example, the one or more acoustic resonators may provide tones at E3 (164.81 Hz) and G3 (196 Hz). In such a scenario, a C Major chord may be provided. In other words, the UAV or other type of vehicle may emit a pleasing chord, which may be preferable to a natural "drone" sound from the propeller and/or engine.

In an example embodiment, the information received from the sensor may indicate a change in the sound emitted from the propeller and/or the acoustic resonator(s). For example, the sound emitted from the propeller may change based on, for instance, a change of an angular rotation rate of the propeller. That is, as the propeller RPM is decreased, a tone emitted by the propeller may become lower. Furthermore, as the propeller RPM is increased, a tone emitted by the propeller may become higher. Other conditions may change the tones emitted by the propeller and/or the acoustic resonator(s). For example, the respective tones may change based on, for example, airspeed of the aircraft or vehicle or an angle of attack of the aircraft. In some example embodiments, the acoustic resonators may be adjusted so as to compensate for such changing conditions and maintain a major chord or other successive tone pattern.

III. Example Methods

Figure 5:
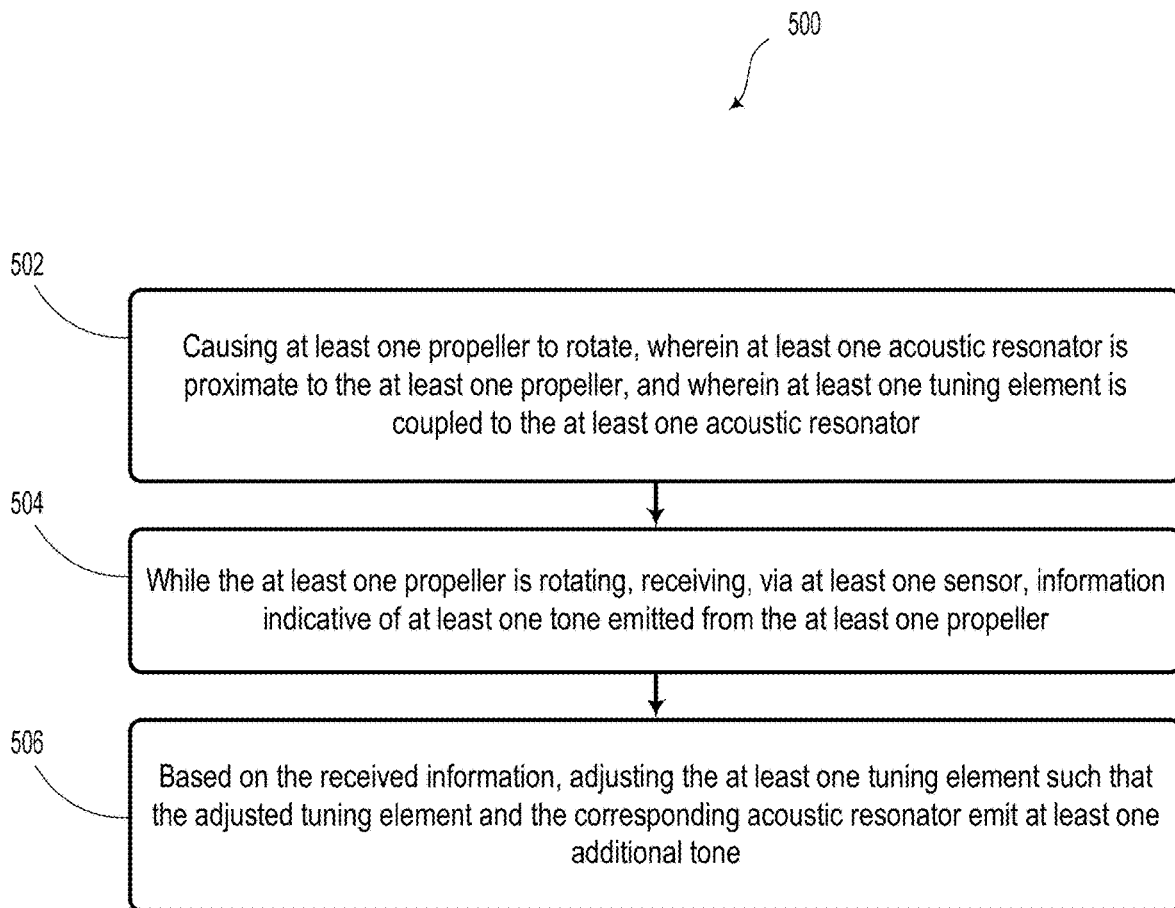
FIG. 5 illustrates a method, according to an example embodiment.

FIG. 5 illustrates a method 500, according to an example embodiment. The method 500 may include various blocks or steps. The blocks or steps may be carried out individually or in combination. The blocks or steps may be carried out in any order and/or in series or in parallel. Further, blocks or steps may be omitted from or added to method 500.

Some or all blocks of method 500 may involve elements of system 100, aircraft 200, 210, 230, or 240 and/or propeller assemblies 300, 320, 330, 340, and 350 as illustrated and described in reference to FIGS. 1, 2A-2D, 3A-3C, and 4A-4B. For example, some or all blocks of method 500 may be carried out by controller 150 and/or processor 152 and memory 154.

Block 502 includes causing at least one propeller to rotate. For example, in reference to FIG. 3C, the method may include causing propeller 302 to rotate so as to provide thrust to an aircraft, such as a UAV, or another type of propeller-driven vehicle. An acoustic resonator, such as acoustic resonator 360, may be located proximate to the at least one propeller. Additionally, at least one tuning element may be coupled to the acoustic resonator. In an example embodiment, the tuning element could be tuning element 366 as illustrated and described in reference to FIG. 3C. In an embodiment, the acoustic resonator may form at least a portion of a shroud, which may include an enclosure that at least partially encloses the propeller.

Block 504 includes, while the at least one propeller is rotating, receiving, via at least one sensor, information indicative of at least one tone emitted from the at least one propeller. The at least one sensor may be sensor 140 or sensor 314 as illustrated and described in FIGS. 1 and 3A, respectively. Namely, the sensor may be configured to provide information indicative of a sound spectrum of the environment near the propeller assembly or, more generally, the environment near the aircraft or vehicle. That is, the sensor may provide information about the sounds that a person may hear while near the aircraft or vehicle.

While the propeller is rotating, the propeller may induce natural tones based on, for example, displacing air in a periodic fashion. The sensor may be configured to provide information about the tones produced naturally by the propeller.

Block 506 includes, based on the received information, adjusting the at least one tuning element such that the adjusted tuning element and the corresponding acoustic resonator emit at least one additional tone. Furthermore, a combination of the at least one additional tone and the natural tone emitted from the propeller may form an interval. For example, a tuning element associated with an acoustic resonator may be adjusted such that the acoustic resonator provides one or more tones so as the combination of natural and further tones forms a major chord. Adjusting the at least one tuning element may include adjusting at least one surface of the shroud based on a desired interval with respect to the at least one tone.

In an example embodiment, adjusting the at least one tuning element may include adjusting a resonant condition of the acoustic resonator based on a desired interval with respect to the at least one tone. As an example, a desired interval may include a major third, perfect fifth, or another interval selected so as to provide given chord. In such a scenario, the chord may include a plurality of intervals with respect to the at least one natural tone (emitted by the propeller normally). In some embodiments, the acoustic resonator may form tones that make up a melody or harmony. For example, the melody or harmony may include a plurality of successive tones provided by the acoustic resonator. The melody or harmony may include a well-known song, e.g., the Happy Birthday Song or Take Me Out to the Ballgame, or another characteristic melody or harmony.

In some embodiments, the tones emitted by the acoustic resonator(s) may be selected based on a mode of operation of the vehicle or another flight characteristic. For example, in the case of a UAV, a melody may be selected from a plurality of possible melodies based on at least one of a flight mode of the UAV, a position of the UAV, or an altitude of the UAV. In some embodiments, for example, an aircraft may emit a first chord or melody during cruising flight and change to a second chord or melody during hover and/or package delivery. Other contextually-dependent tone/melody selections are possible.

In an example embodiment, methods and systems may provide users with an ability to control tones, melodies, and/or chords emitted from the aircraft. For example, users may choose or preset tones or melodies that are pleasing to them. In a UAV package-delivery scenario, the UAV may be controlled to emit tones/melodies according to a preference of the delivery recipient.

In another embodiment, methods and system may include emitting tones or melodies based on contextual awareness. For example, while flying near a baseball stadium, the aircraft may play "Take Me Out to the Ballgame." Additionally or alternatively, the aircraft may play an alarm tone or melody if running out of fuel or batteries. In an example embodiment, a volume of the emitted tones and/or their content may be based on a time of day. For example, while at night, an aircraft may decrease the volume of emitted tones. In some embodiments, the emitted tones may be silenced or otherwise attenuated when flying over unpopulated areas. Other types of contextual scenarios are possible.

In some embodiments, additional emitted tones may be silenced or otherwise adjusted to optimize a flight performance of the aircraft. For example, adjusting the emitted tones may improve battery/fuel efficiency, speed, vibration, or other flight performance measures.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A device, comprising:
   at least one propeller, wherein, while rotating, the at least one propeller emits at least one tone; and
   at least one acoustic resonator proximate to the at least one propeller, wherein the at least one acoustic resonator is configured to emit at least one additional tone, wherein the at least one additional tone forms an interval with respect to the at least one tone, wherein the interval comprises a major third or a fifth.

2. The device of claim 1, wherein the at least one acoustic resonator forms at least a portion of a shroud, wherein the shroud comprises an enclosure that at least partially encloses the at least one propeller.

3. The device of claim 1, wherein the at least one tone and the at least one additional tone form a chord, wherein the chord comprises a plurality of intervals with respect to the at least one tone, wherein the plurality of intervals comprise at least a major third and a perfect fifth.

4. The device of claim 1, wherein the device is incorporated in an unmanned aerial vehicle (UAV) and wherein the at least one propeller is configured to provide propulsion for the UAV.

5. The device of claim 4, wherein the at least one tone and the at least one additional tone form a chord, wherein the chord is selected based on at least one of a flight mode of the UAV, a position of the UAV, or an altitude of the UAV.

6. A device, comprising:
   at least one propeller, wherein, while rotating, the at least one propeller emits at least one tone; and
   at least one acoustic resonator proximate to the at least one propeller, wherein the at least one acoustic resonator is configured to emit at least one additional tone, wherein the at least one additional tone forms a melody, wherein the melody comprises a plurality of successive additional tones.

7. The device of claim 6, wherein the at least one acoustic resonator forms at least a portion of a shroud, wherein the shroud comprises an enclosure that at least partially encloses the at least one propeller.

8. The device of claim 6, wherein the device is incorporated in an unmanned aerial vehicle (UAV) and wherein the at least one propeller is configured to provide propulsion for the UAV.

9. The device of claim 8, wherein the at least one tone and the at least one additional tone form a melody selected from a plurality of possible melodies, wherein the plurality of possible melodies is selected based on at least one of a flight mode of the UAV, a position of the UAV, or an altitude of the UAV.

10. A method, comprising:
    causing at least one propeller of an unmanned aerial vehicle (UAV) to rotate, wherein the at least one propeller is configured to provide propulsion for the UAV, wherein at least one acoustic resonator is proximate to the at least one propeller, and wherein at least one tuning element is coupled to the at least one acoustic resonator;
    based on a flight mode of the UAV, a position of the UAV, or an altitude of the UAV, adjusting the at least one tuning element such that the adjusted tuning element and the corresponding acoustic resonator emit at least one additional tone.

11. The method of claim 10, wherein adjusting the at least one tuning element comprises adjusting a resonant condition of the acoustic resonator based on a desired interval with respect to the at least one tone.

12. The method of claim 10, wherein the at least one acoustic resonator forms at least a portion of a shroud, wherein the shroud comprises an enclosure that at least partially encloses the at least one propeller.

13. The method of claim 12, wherein adjusting the at least one tuning element comprises adjusting at least one surface of the shroud based on a desired interval with respect to the at least one tone.

14. The method of claim 10, wherein the at least one additional tone forms an interval with respect to the at least one tone, wherein the interval comprises a major third or a fifth.

15. The method of claim 10, wherein the at least one tone and the at least one additional tone form a chord, wherein the chord comprises a plurality of intervals with respect to the at least one tone, wherein the plurality of intervals comprise at least a major third and a perfect fifth.

16. The method of claim 10, wherein the at least one additional tone forms a melody, wherein the melody comprises a plurality of successive additional tones.

\* \* \* \* \*